(12) United States Patent
Kanczuzewski et al.

(10) Patent No.: US 9,764,679 B2
(45) Date of Patent: Sep. 19, 2017

(54) CARGO RESTRAINT METHOD

(71) Applicant: LOGISTICK, INC., South Bend, IN (US)

(72) Inventors: Nicholas Kanczuzewski, Mishawaka, IN (US); John E. Townsend, Paw Paw, MI (US)

(73) Assignee: LOGISTICK, INC., South Bend, IN (US)

( * ) Notice: Subject to any disclaimer, the term of this patent is extended or adjusted under 35 U.S.C. 154(b) by 183 days.

(21) Appl. No.: 14/854,327

(22) Filed: Sep. 15, 2015

(65) Prior Publication Data

US 2017/0072832 A1    Mar. 16, 2017

(51) Int. Cl.
| | |
|---|---|
| *B60P 7/15* | (2006.01) |
| *B60P 7/08* | (2006.01) |
| *B60P 7/135* | (2006.01) |
| *B60P 7/06* | (2006.01) |

(52) U.S. Cl.
CPC .............. *B60P 7/15* (2013.01); *B60P 7/0815* (2013.01); *B60P 7/0892* (2013.01); *B60P 7/135* (2013.01); *B60P 7/06* (2013.01); *B60P 7/0807* (2013.01)

(58) Field of Classification Search
CPC .... B60P 7/14; B60P 7/15; B60P 7/135; B60P 7/0892; B60P 7/0807; B60P 7/0815; B60P 7/06; Y10T 28/49948
See application file for complete search history.

(56) References Cited

U.S. PATENT DOCUMENTS

| | | |
|---|---|---|
| 969,002 A | 8/1910 | Teachout |
| 1,401,419 A | 12/1921 | Mcnally |
| 1,951,660 A | 3/1934 | Klaudt |
| 2,124,082 A | 7/1938 | Reifer |
| 2,414,160 A | 1/1947 | Moon |
| 2,464,080 A | 3/1949 | Hankins |
| 2,467,681 A | 4/1949 | McKinney |
| 2,468,101 A | 4/1949 | Nampa |
| 2,697,631 A | 12/1954 | Miller |
| 2,752,864 A | 7/1956 | McDougal, Sr. et al. |
| 2,766,704 A | 10/1956 | McMahon |
| 2,845,245 A | 5/1958 | Gray et al. |
| 2,912,939 A | 11/1959 | Miner, Jr. et al. |
| 2,980,037 A | 4/1961 | Elsner |
| 2,993,708 A | 7/1961 | Holman, Jr. |
| 3,075,478 A | 1/1963 | Elsner |
| 3,177,007 A | 4/1965 | Oren |
| 3,344,750 A | 10/1967 | Kostrewa |
| 3,367,286 A | 2/1968 | Jantzen |
| 3,559,591 A | 2/1971 | Breen et al. |
| 3,590,746 A | 7/1971 | Gibson |
| 3,712,663 A | 1/1973 | Laven |
| 3,836,174 A | 9/1974 | Holman, Jr. |
| 3,995,565 A | 12/1976 | Kersey |
| 4,026,508 A | 5/1977 | Ziegler |
| 4,080,906 A | 3/1978 | Brown |

(Continued)

FOREIGN PATENT DOCUMENTS

GB    1209255    10/1970

OTHER PUBLICATIONS

Office Action issued in U.S. Appl. No. 14/854,273 (dated Aug. 10, 2016).

*Primary Examiner* — Jermie Cozart
(74) *Attorney, Agent, or Firm* — Barnes & Thornburg LLP (57) ABSTRACT

A method for engaging an elongated support for restraining cargo in a container having opposed corrugated walls or flat walls.

18 Claims, 7 Drawing Sheets

(56) References Cited

U.S. PATENT DOCUMENTS

| | | |
|---|---|---|
| 4,264,251 A | 4/1981 | Blatt |
| 4,278,376 A | 7/1981 | Hunter |
| 4,396,325 A | 8/1983 | Joice-Cavanagh |
| 4,432,678 A | 2/1984 | Liebel |
| 4,498,824 A | 2/1985 | Kinkle |
| 4,616,757 A | 10/1986 | Hobson |
| 4,700,918 A | 10/1987 | Andrasko, Jr. |
| 4,718,584 A | 1/1988 | Schoeny |
| D294,340 S | 2/1988 | Robson |
| 4,735,468 A | 4/1988 | Taylor, Jr. et al. |
| 4,756,498 A | 7/1988 | Frye |
| 4,830,558 A | 5/1989 | Sweeney |
| 4,846,610 A | 7/1989 | Schoenleben |
| 4,880,342 A | 11/1989 | Pradovic |
| 4,932,817 A | 6/1990 | Mattare |
| 4,955,771 A | 9/1990 | Bott |
| 4,962,907 A | 10/1990 | Gary |
| D312,604 S | 12/1990 | Barnes et al. |
| 4,982,922 A | 1/1991 | Krause |
| 5,028,184 A | 7/1991 | Krause |
| D324,303 S | 3/1992 | Miller |
| 5,156,110 A | 10/1992 | Fuller |
| 5,161,700 A | 11/1992 | Stannis et al. |
| 5,169,007 A | 12/1992 | McHendry |
| D332,242 S | 1/1993 | Graehling |
| 5,219,251 A | 6/1993 | Kanczuzewski |
| D339,682 S | 9/1993 | Phelps |
| 5,259,712 A | 11/1993 | Wayne |
| 5,281,063 A | 1/1994 | Austin, III |
| D344,482 S | 2/1994 | Arvidsson |
| D347,419 S | 5/1994 | Jackson |
| 5,320,464 A | 6/1994 | Long et al. |
| 5,326,204 A | 7/1994 | Carlson et al. |
| 5,362,184 A | 11/1994 | Hull et al. |
| 5,370,482 A | 12/1994 | Long |
| 5,392,972 A | 2/1995 | Caruso et al. |
| D358,125 S | 5/1995 | Jackson |
| 5,494,389 A | 2/1996 | Kanczuzewski |
| 5,526,972 A | 6/1996 | Frazier et al. |
| D372,016 S | 7/1996 | Wolford |
| D373,754 S | 9/1996 | Pinterpe |
| D376,578 S | 12/1996 | Redford |
| D382,533 S | 8/1997 | Okland |
| 5,688,087 A | 11/1997 | Stapleton et al. |
| D392,246 S | 3/1998 | Anderson |
| D397,322 S | 8/1998 | Tobin |
| 5,807,047 A | 9/1998 | Cox |
| D406,095 S | 2/1999 | Denny et al. |
| D412,151 S | 7/1999 | Ferrigan |
| D422,554 S | 4/2000 | Stapleton et al. |
| D426,512 S | 6/2000 | Ciuba |
| 6,074,143 A | 6/2000 | Langston et al. |
| 6,086,299 A | 7/2000 | Kanczuzewski |
| D434,369 S | 11/2000 | Matthies |
| D438,022 S | 2/2001 | Bunn |
| D450,291 S | 11/2001 | Wang |
| D453,869 S | 2/2002 | Schultz et al. |
| D458,210 S | 6/2002 | Kanczuzewski et al. |
| 6,419,434 B1 | 7/2002 | Rahn |
| 6,533,513 B2 | 3/2003 | Kanczuzewski et al. |
| D478,857 S | 8/2003 | Petersen et al. |
| 6,607,338 B2 | 8/2003 | Lemke |
| 6,851,652 B1 | 2/2005 | Huang |
| 6,874,982 B2 | 4/2005 | Rhodes |
| D506,076 S | 6/2005 | Weisgerber |
| D537,405 S | 2/2007 | Saward |
| 7,334,973 B2 | 2/2008 | Scott |
| D571,279 S | 6/2008 | Trusty et al. |
| D589,709 S | 4/2009 | Edwards |
| 7,713,008 B2 | 5/2010 | Kanczuzewski et al. |
| 7,785,051 B2 | 8/2010 | Kanczuzewski et al. |
| 7,817,922 B2 | 10/2010 | Cho et al. |
| D633,030 S | 2/2011 | Robertson |
| D638,345 S | 5/2011 | Kanczuzewski et al. |
| 8,192,121 B1 | 6/2012 | Kanczuzewski et al. |
| 8,425,166 B2 | 4/2013 | Kanczuzewski et al. |
| 8,545,150 B2 | 10/2013 | Kanczuzewski et al. |
| 8,545,151 B2 | 10/2013 | Kanczuzewski et al. |
| 8,550,758 B2 | 10/2013 | Kanczuzewski et al. |
| 9,234,537 B2 | 1/2016 | Huang |
| 2002/0176759 A1 | 11/2002 | Kanczuzewski |
| 2008/0152455 A1 | 6/2008 | Kanczuzewski |
| 2010/0111636 A1 | 5/2010 | Widynowski |
| 2010/0308091 A1 | 12/2010 | Hubbard |
| 2011/0068137 A1 | 3/2011 | Murray et al. |

CARGO RESTRAINT METHOD

BACKGROUND

Cargo transported for commercial and other uses is often shipped in semi-trailers or other trucks, railcars, ships, aircraft or other containers. In most instances, shifting or translation of cargo within the container can occur during shipping which can lead to damage. U.S. Pat. Nos. 6,533,513, 6,086,299 and 5,494,389, disclose cargo retention devices that have been well received in the shipping industry. A pair of such cargo retention devices may be secured on opposed walls of the shipping container, and an elongated support in the form of a wood beam or the like is positioned across the bed of the shipping vehicle and engaged with the cargo retention devices to secure cargo. These devices are less effective, however, when the walls of the shipping container are corrugated because these devices are better suited for securement to flat walls.

SUMMARY

The present disclosures relates to method for engaging an elongated support for restraining cargo in a container having a pair of spaced walls. The method comprises securing to one of the walls a cargo restraint device comprising a sleeve member defining a cavity for receiving an end of the elongated support, including securing a securing surface of a base of the sleeve member to said one wall; engaging the sleeve member and a bracket having a securing surface securable to said one wall; securing the bracket to said one wall adjacent the cargo restraint device; and inserting the end of the elongated support into the cavity to engage the elongated support and the sleeve member. This method may be used with another cargo restraint device and bracket on the other wall.

Securing the securing surface of the bracket to said one wall may include securing the securing surface of the bracket selectively on either side of said the cargo restraint device. Securing the securing surface of the bracket to the wall may also include adjustably positioning the bracket relative to the cargo restraint device. The bracket may be slidable relative to the cargo restraint device for adjustability positioning the bracket relative to the cargo restraint device.

Where the wall of the container is corrugated, adjustably positioning may include selectively positioning the bracket in a first position relative to the cargo restraint device when the sleeve member is secured to a peak of the wall and in a second position relative to the cargo restraint device when the sleeve member is secured to a trough of the wall. Where the wall is flat, adjustably positioning includes selectively positioning the bracket so that the securing surface of the cargo restraint device and the securing surface of the bracket are substantially flush.

Engaging the sleeve member and the bracket may include inserting an engagement member of the sleeve member into a slot defined by the bracket. The sleeve member may include two engaging members and engaging the sleeve member and the bracket may include inserting selectively either one of the engagement members into a slot defined by the bracket. Engaging the sleeve member and the bracket may include inserting into a slot defined by the bracket an engagement member of the sleeve member having a T-shaped cross section extending along a support wall of the sleeve member.

The sleeve member may have a pair of lateral support walls and an engagement member on each support wall and engaging the sleeve member and the bracket may include selectively inserting into a slot defined by the bracket either one of the engagement members. The method may include selectively selecting as the elongated support an elongated support having a first dimension receivable by the cavity or an elongated support having a second dimension receivable by the cavity. For example, the method may include selectively selecting as the elongated support a 2×4 receivable by the cavity or a 4×4 receivable by the cavity.

Features and advantages of the disclosure will be set forth in part in the description which follows and the accompanying drawings described below, wherein an embodiment of the disclosure is described and shown, and in part will become apparent upon examination of the following detailed description taken in conjunction with the accompanying drawings.

DETAILED DESCRIPTION

Figure 1:
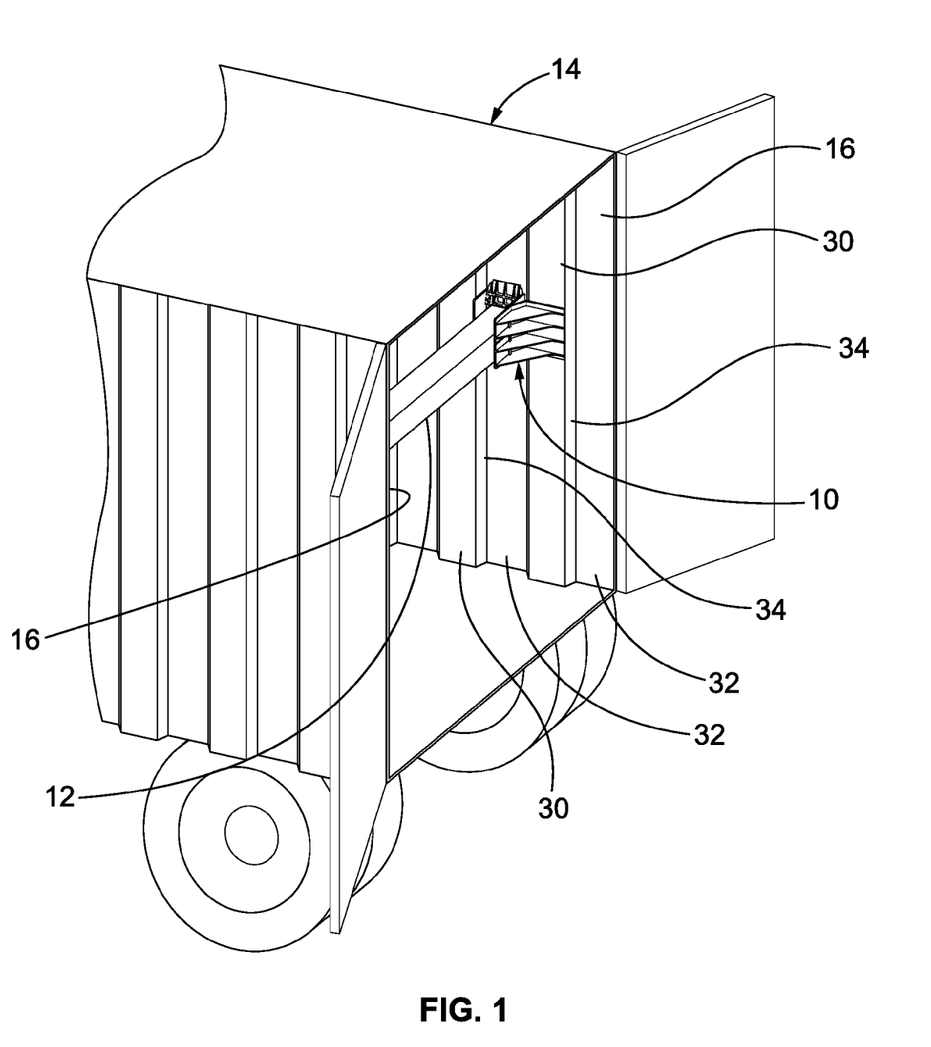
FIG. 1 is a partial view of a shipping container and a cargo restraint assembly and an elongated support being used with another cargo restraint assembly (not shown) for restraining cargo in the shipping container in accordance with an illustrated embodiment of the present disclosure.
Figure 2:
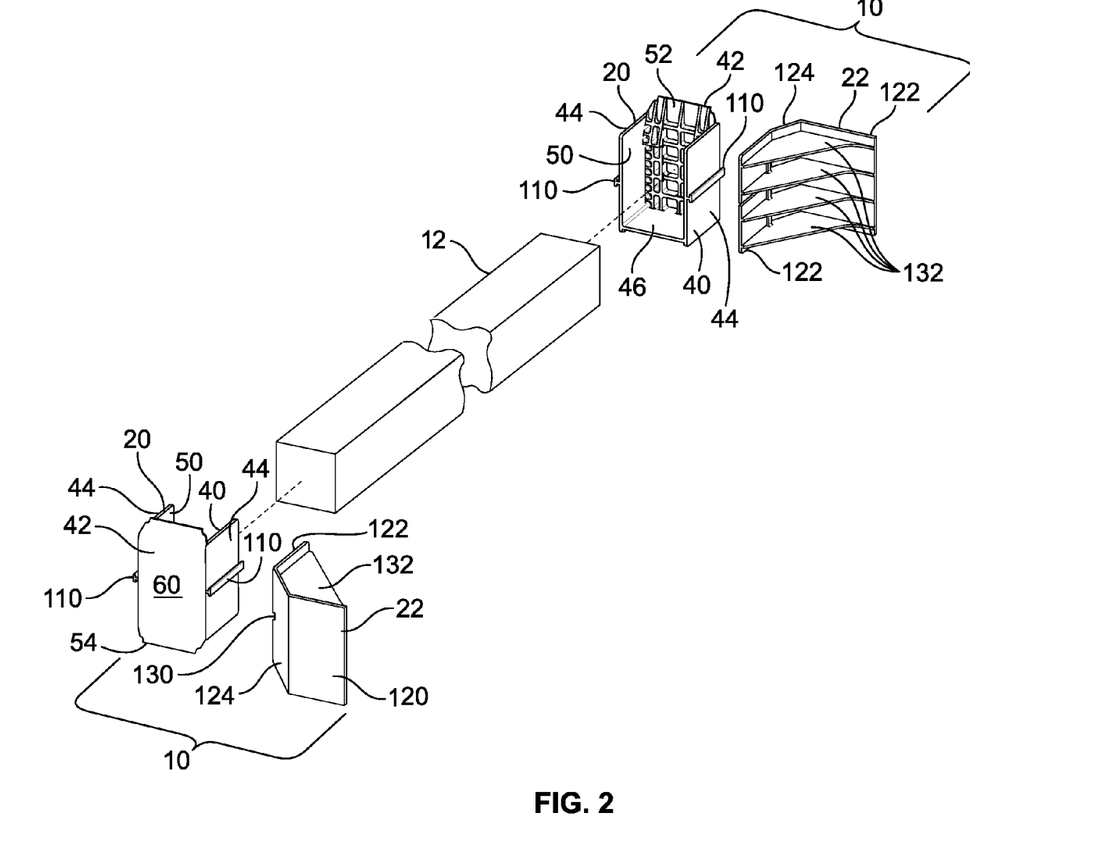
FIG. 2 is an exploded view illustrating the cargo restraint assemblies and the elongated support and also illustrating the cargo restraint brackets of the cargo restraint assemblies separated from the cargo restraint devices.

FIGS. 1 and 2 illustrate a pair of cargo restraint assemblies 10 and an elongated support 12 for restraining cargo in a shipping container 14 having a pair of opposed walls in the form of corrugated walls 16. Each cargo restraint assembly 10 includes a cargo restraint device 20 and a cargo restraint bracket 22 engageably with the cargo restraint device. The cargo restraint bracket 22 may be omitted in some applications.

In the illustrated embodiment, the pair of cargo restraint assemblies 10 is secured to the opposed corrugated walls 16 of the container 14 and is engaged with the elongated support 12, with the elongated support 12 extending elevated across the bed of the container 14. The cargo restraint assembly 10 and the elongated support 12 in accordance with the present disclosure may be used for limiting or otherwise restraining the shifting of cargo being transported by or within the container 14, which may be in the form of any shipping vehicle or other container, such as, for example, any type of truck, railcar, ship or aircraft or other shipping vehicle.

The opposed corrugated walls 16 may comprise any suitable corrugated structure known in the art or otherwise. Each corrugated wall 16 includes a plurality of peaks 30, a plurality of troughs 32, and a plurality of corrugation walls 34 extending at an angle from the peaks to the troughs and interconnecting the peaks and troughs. The peaks 30, troughs 32 and corrugation walls 34 define a plurality of canyons 36. The corrugation walls 34 may extend at any suitable angle from the peaks 30 to the troughs 32 and may terminate on either end in rounded corners or sharp corners. Each peak 30 has a peak width. Each trough 32 has a trough width that may be the substantially the same as the peak width. Each canyon 36 has a canyon width that decreases as it extends from the peak 30 to the trough 32. The corrugations may, for example, be corrugated walls of the type associated with containers used by rail owned or rail associated carriers such as, for example, Norfolk Southern, Union Pacific, CSX, BNSF, CN, or CP, or freight companies such as, for example, JB Hunt, Schneider National, Hub Group, XPO Logistics, Swift Transportation, Werner, Knight Transportation, C.H. Robinson or APL Logistics. The corrugations may have any other suitable configurations. Walls 16 may instead by flat walls.

In the illustrated embodiment of the present disclosure, the cargo restraint device 20 comprises generally a sleeve member 40 including a base 42, a pair of parallel spaced lateral support walls 44 and a ledge 46 extending from the base and interconnecting the pair of spaced lateral support walls. The lateral support walls 44 and the ledge 46 extend away from a top of the base 42 and define an open sided cavity 50 for receiving the end of the elongated support 12 to engage the elongated support. The base 42 includes a ramp 52 adjacent the open side of the cavity 50 and an extension member 54 extending from the ledge 46 on the opposite side of the cavity 50 along the length of the base. The base 42 also includes a gusset 56 interconnecting the ledge 46 and the extension member 54. The illustrated base 42 comprises a series of struts 58 extending longitudinally and laterally to provide sufficient strength while also affording manufacturing economies. The cargo restraint device 20 may have other configurations in accordance with other embodiments of the present disclosure.

Figure 6:
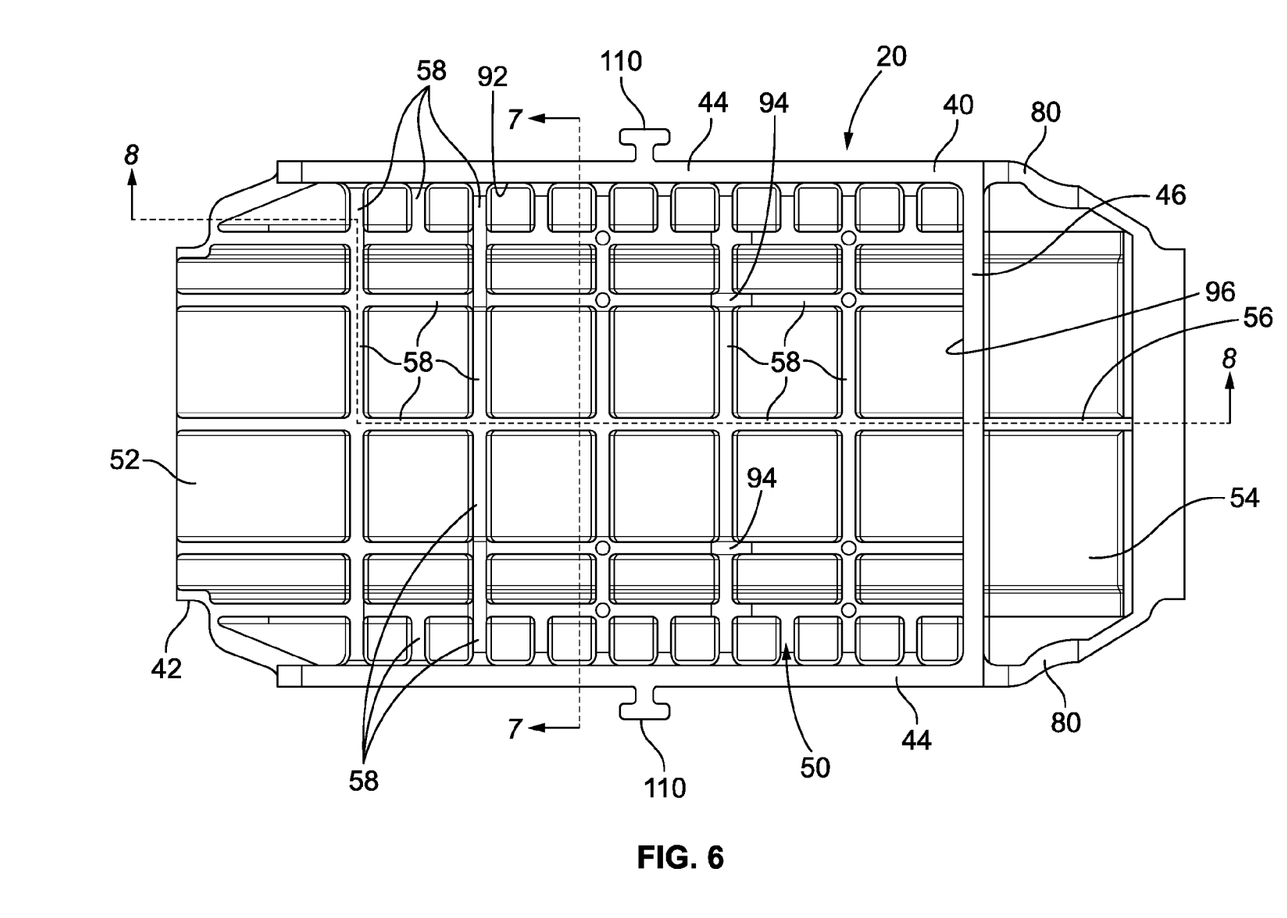
FIG. 6 is a plan view of the cavity side of one of the cargo restraint assemblies of FIG. 2.
Figure 7:
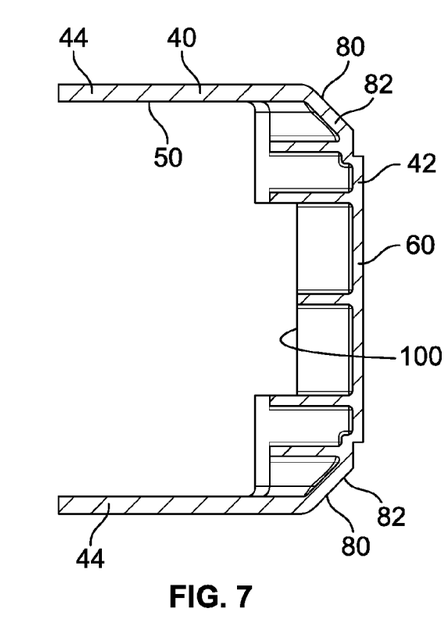
FIG. 7 is a section view taken along the lines 7-7 of FIG. 6.
Figure 8:
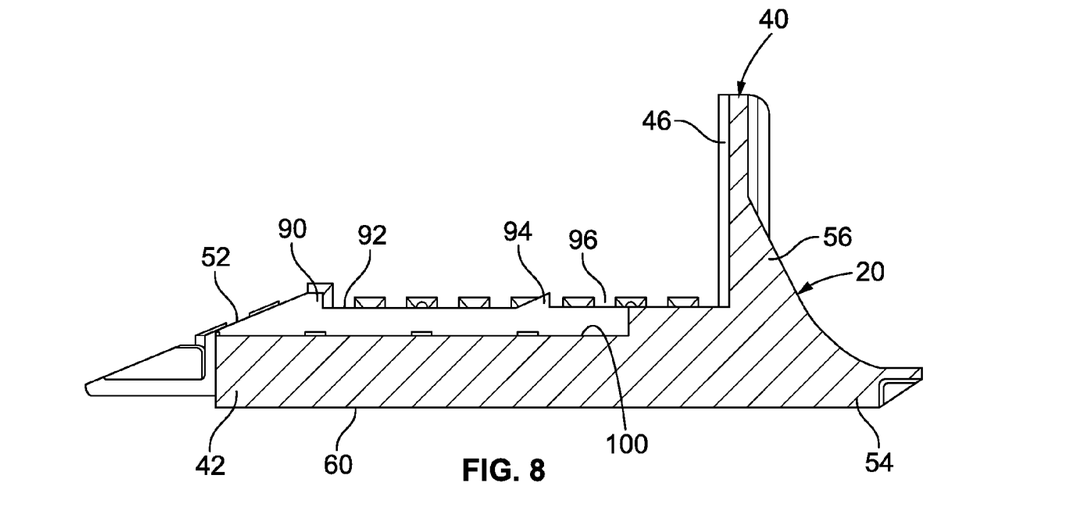
FIG. 8 is a section view taken along the lines 8-8 of FIG. 6.

The base 42 also includes a securing surface 60 associated with a bottom of the base, extending along substantially the entire length of the base, for selectively securing the cargo restraint device 20 to one of the peaks 30 or one of the troughs 32 of one of the corrugated walls 16 of the container 14 or to a flat wall. Instead, if the wall of the container is flat, the securing surface 60 may be secured to the flat wall. The securing surface 60 faces opposite the cavity 50. In the illustrated embodiment, the securing surface 60 is longer than the lateral support walls 44 and extends substantially the entire length of the base 42, from along a bottom of the lead end of the ramp 52 to along a bottom of the extension member 54. The securing surface 60 has a width the same or slightly less than each of the peak width and the trough width to facilitate securement to the peak 30 or trough 32 if the cargo restraint device is being secured to a corrugated wall. The extension member 54 terminates in a pry tab 62 defining an opening for facilitating removal of the cargo restraint device 20 or cargo restraint assembly 10 from the corrugated wall 16 with any suitable tool or other device or by hand. The base 42 may have other configurations in accordance with other embodiments of the present disclosure.

The securing surface 60 may include an adhesive for securing the securing surface selectively to the wall. The adhesive may be in any suitable form. The adhesive may, for example, be in the form of an acrylic based or rubber based adhesive. A removable release liner may also be included. After removal of the release liner, the cargo restraint device 20 can be pressed against one of the walls 16 of the container 14 to selectively secure it to the peak 30 or trough 32 or, alternatively, to a flat wall. The adhesive may be instead disposed directly on the rear surface, may be in the form of a two-sided tape with a removable release liner, or may be in any other suitable form.

The width of the cavity 50 is greater than the width of the securing surface 60 to accommodate elongated supports 12 having a lateral dimension greater than the width of the securing surface 60. The base 42 also includes a pair of base walls 80 extending from the lateral support walls toward the securing surface 60 at an obtuse angle. The width of the base 42 as measured from the outside of the base walls 80 as the base walls extend from the lateral support walls 44 to the securing surface 60 decreases to form a pair of voids 82 on opposed sides of the base 42 such that the base walls can be received by the canyon 36 if the sleeve member 40 is secured to one of the troughs 32.

Figure 5A:
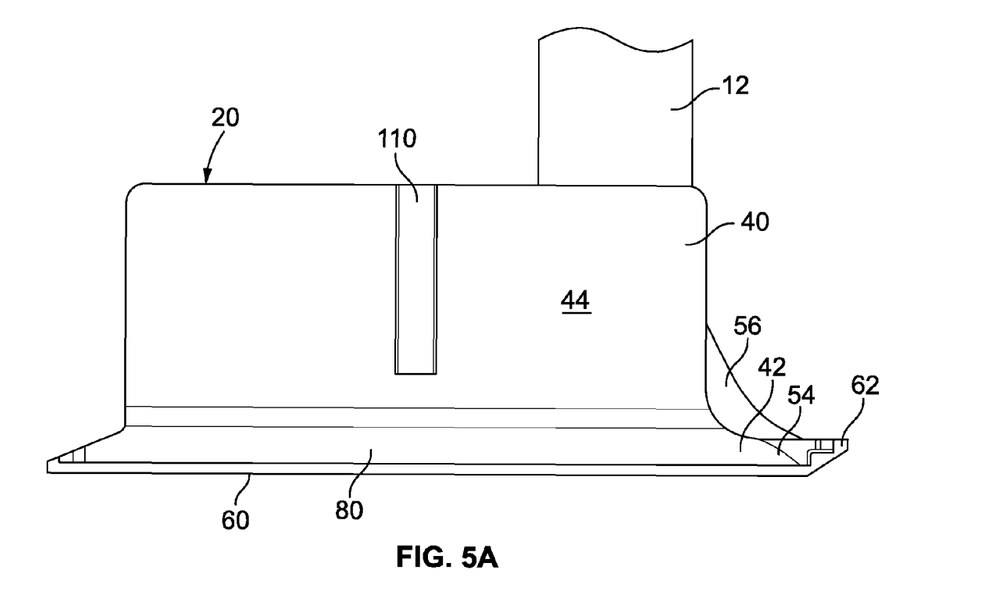
FIG. 5(a) is a side view of the cargo restraint device of one of the cargo restraint assemblies of FIG. 2 and the elongated support in the form of a wood 2×4 engaged with the cargo restraint device.
Figure 5B:
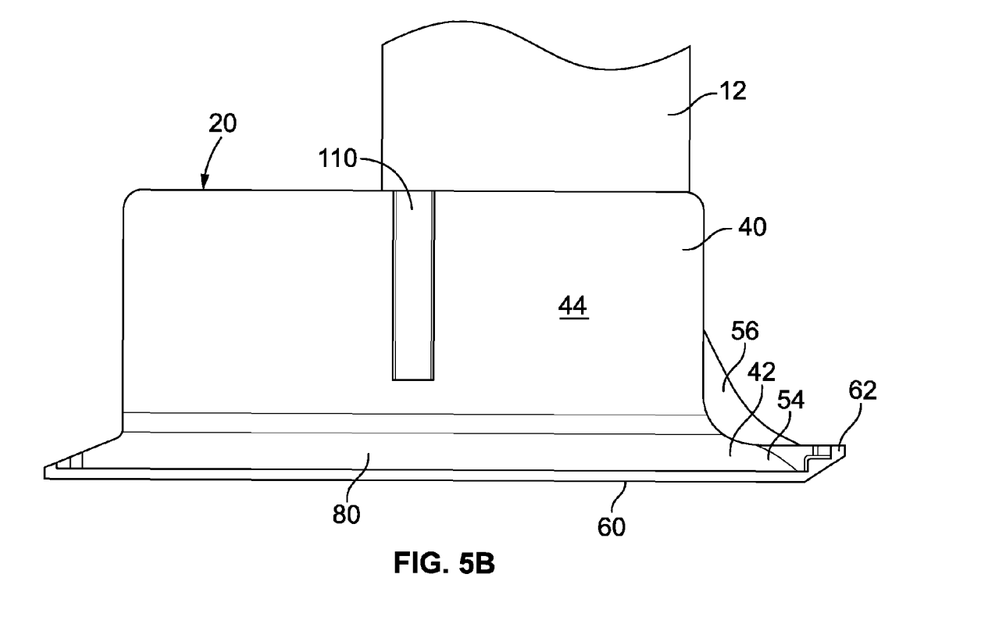
FIG. 5(b) is a side view of the cargo restraint device of one of the cargo restraint assemblies of FIG. 2 and the elongated support in the form of a wood 4×4 engaged with the cargo restraint device.

The illustrated sleeve member 40 is sized and configured to selectively receive in the cavity 50 as the elongated support 12 either a wood 2×4 or a wood 4×4 (see, e.g., FIGS. 5(a) and 5(b)). The cavity 50 can receivably engage an elongated support 12 having a lateral dimension greater the width of the securing surface 120. In the case of the wood 2×4, the longer side of the 2×4 extends along the width of the cavity 50. The base 42 includes a pair of teeth 90 to define a cavity 92 within cavity 50 for receivably engaging a 4×4 and another pair of teeth 94 to define a cavity 96 within cavity 50 for engaging a 2×4. The base 42 also defines a pry slot 100 contiguous with the cavity 50 for facilitating removal of the elongated support 12. The pry slot 100 extends along the length of the base from or otherwise adjacent a front end of the ramp 52 to beyond both pairs of teeth 90 and 94 and is disposed between teeth 90 and between teeth 94 so that the prying slot 100 can be used to facilitate removal of either a 2×4 or a 4×4, depending upon which elongated support 12 is selected for installation. The sleeve member 40 may have other configurations and may be configured to receive other elongated supports in accordance with other embodiments of the present disclosure.

Figure 3:
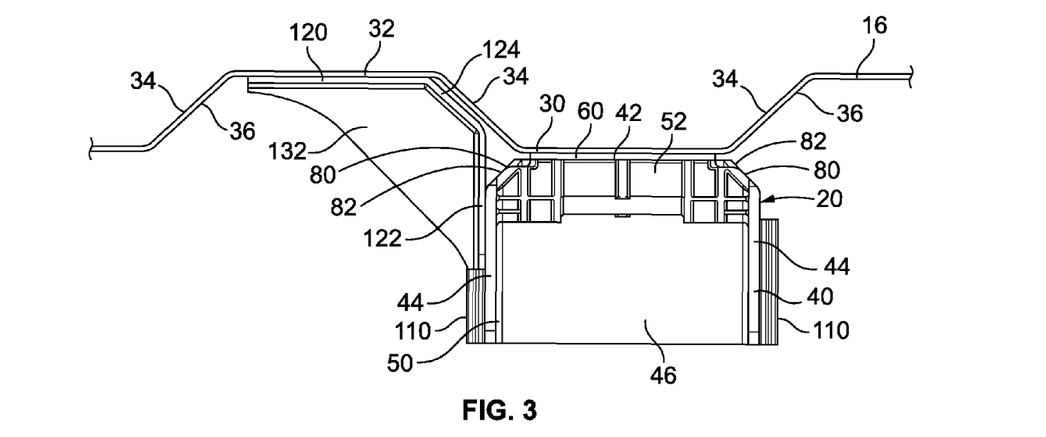
FIG. 3 is a top view of a corrugated wall illustrating one of the cargo restraint assemblies of FIG. 2 secured to the corrugated wall, with the cargo restraint device secured to a peak of the corrugated wall and the cargo restraint bracket secured to a trough of the corrugated wall adjacent the peak.
Figure 4:
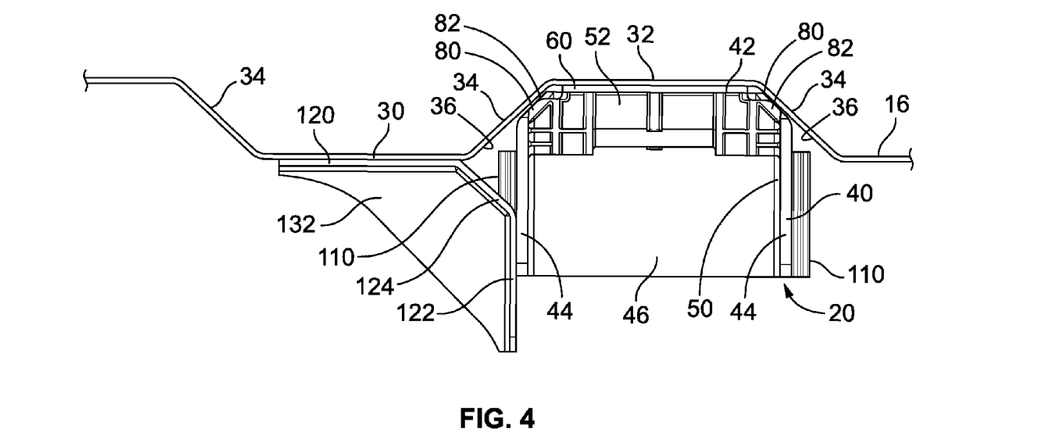
FIG. 4 is a top view of a corrugated wall illustrating one of the cargo restraint assemblies of FIG. 2 secured to the corrugated wall, with the cargo restraint device secured to the trough of the corrugated wall and the cargo restraint bracket secured to a peak of the corrugated wall adjacent the peak.

The sleeve member 40 also includes an engaging member in the form of a connector 110 on the outside of each lateral support wall 44 removably attachable and slidably engageable with the cargo restraint bracket 22. In the illustrated embodiment, the cargo restraint bracket 22 is slidable relative to the sleeve member 40 of the cargo restraint device 20 such that it can be positioned anywhere along the length of the connector 110. For example, the cargo restraint bracket 22 can be positioned such that it can be secured on a trough 32 when the sleeve member 40 is secured to an adjacent peak 30; the cargo restraint bracket can be positioned such that it can be secured to a peak when the sleeve member is secured to an adjacent trough; or the cargo restraint bracket can be positioned such that the securing surfaces 60 and 120 are substantially flush when the cargo restraint assembly 10 is secured to a flat wall.

Each of the illustrated connectors 110 has a T-shaped cross section. The connectors 110 may extend from the top of the lateral support wall 44 toward the bottom of the lateral support wall substantially the entire height of the lateral support wall to provide a rigid engagement with the cargo restraint bracket 22. The structure of connector 110 also facilitates removal of the cargo restraint bracket 22 together with cargo restraint device 20 using the pry tab 62. The engaging member may have any other configuration in accordance with other embodiments of the present disclosure.

Figure 9:
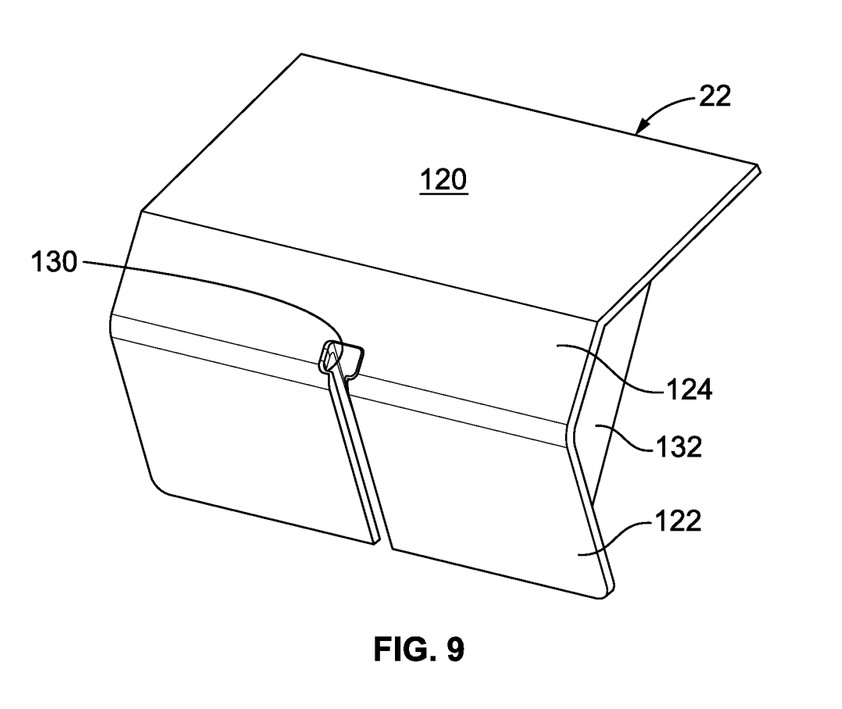
FIG. 9 is a perspective view of the cargo restraint bracket of one of the cargo restraint assemblies of FIG. 2.

The cargo restraint bracket 22 comprises a securing surface 120 for selectively engaging one of the peaks 30 or troughs 32 adjacent the cargo restraint device 20 when the cargo restraint device 20 is secured to an adjacent trough or peak. Instead, the securing surface 120 can be secured on a flat wall such that it is adjacent the cargo restraint device 20 when the cargo restraint assembly 10 is secured on a flat wall. The cargo restraint bracket 22 also includes a mounting wall 122, and an interconnecting wall 124 interconnecting the securing surface 120 and the mounting wall. The length of the mounting wall 122 is substantially the same as the length of the lateral support walls 44. The securing surface 120 has a width the same or slightly less than each of the peak width and trough width to facilitate engagement with the peak 30 or trough 32. The mounting wall 122 and the interconnecting wall 124 define a slot 130 having a T-shaped opening for receiving one of the connectors 110 of the cargo restraint device 20 for engaging the cargo restraint device and the cargo restraint bracket 22. The slot 130 extends the entire height of the mounting wall 122 to the interconnecting wall 124 so that the cargo restraint bracket 22 can be adjustably positioned relative to the cargo restraint device 20 during installation. The cargo restraint bracket 22 also includes a plurality of gussets 132 interconnecting the securing surface 120 and the mounting wall 122 to provide strength and rigidity in a cost effective manner. The height of the mounting wall 122 is slightly less than the height of the lateral support wall 44 of the cargo restraint device 20. The width of the securing surface 120 of the cargo restraint bracket 22 is substantially the same as the width of the securing surface 60 of the cargo restraint device 20. The securing surface 120 may include an adhesive for securing the securing surface selectively to one of the peaks 30 or troughs 32. The adhesive may be in any suitable form such as the adhesive associated with the securing surface 60. A removable release liner may also be included. After removal of the release liner, the cargo restraint bracket 22 can be pressed against one of the walls 16 of the container 14 to secure it to the peak 30 or trough 32 or, instead, to a flat wall. The cargo restraint bracket 22 may have other configurations in accordance with other embodiments of the present disclosure.

The illustrated sleeve member 40 is sized and configured to selectively receive in the cavity 50 as the elongated support 12 either a wood 2×4 or a wood 4×4 (see, e.g., FIGS. 5(a) and 5(b)) even though the lateral dimension of either such support may exceed a peak width or a trough width. When the cargo restraint assembly 10 is being secured to a corrugated wall of a container 14, the cargo restraint device 20 may be secured selectively to one of the peaks 30 or one of the troughs 32 of the corrugated wall 16 and to selectively engage a 2×4 or a 4×4 elongated support 12 even though the lateral dimensions of these elongated supports may be greater than the width of each of the peak and the trough. When the cargo restraint device 20 is secured to a trough 32 of a corrugated wall of a container, the sleeve member 40 can be readily received within the canyon 36 because of the configuration of the securing surface 60, the interconnecting walls 80 and the voids 82. The cargo restraint device 20 may be installed with the open side of cavity 50 facing upward so that the elongated support rests on the ledge 46.

When the cargo restraint assembly 10 is instead being secured to a flat wall of a container, the cargo restraint device 20 may be secured on the wall to selectively engage a 2×4 or a 4×4 elongated support 12. The cargo restraint device 20 may be installed with the open side of cavity 50 facing upward so that the elongated support rests on the ledge 46.

The cargo restraint bracket 22 may, optionally, be secured to the cargo restraint device 20 to provide additional strength and stability to the cargo restraint device 20. The cargo restraint bracket 22 may be readily installed. If the cargo restraint device 20 is secured on a peak 30, the cargo restraint bracket 22 may be attached to one of the lateral support walls 44, slidably and adjustably positioned such that the securing surface 120 is positioned lower relative to the corrugated wall 16 than the securing surface 60 of the cargo restraint device 20, and secured to the trough 32 immediately adjacent either side of the peak. If the cargo restraint device 20 is secured on a trough 32, the cargo restraint bracket 22 may be attached to one of the lateral support walls 44, slidably and adjustably positioned such that the securing surface 120 is higher relative to the corrugated wall 16 than the securing surface 60 of the cargo restraint device 20, and secured to the peak 30 immediately adjacent either side of the trough. If the cargo restraint device 20 is secured on a flat wall, the cargo restraint bracket 22 may be attached to one of the lateral support walls 44, slidably and adjustably positioned such that the securing surface 120 is substantially flush with the securing surface 60 of the cargo restraint device 20, and secured to the flat wall immediately adjacent either side of the cargo restraint device 10.

Although the cargo restraint bracket 22 may be secured to either lateral support wall 44 of the cargo restraint device 20 for positioning on either adjacent side, the cargo restraint assembly 10 typically provides better load support if the cargo restraint bracket is secured to the cargo restraint device 20 opposite the location of the cargo. Once the cargo has reached its destination, the elongated support 12 can be readily separated from the cargo restraint assembly 10 using pry slot 100. Additionally, the cargo restraint assembly 10, including the cargo restraint bracket 22, can be readily separated from the corrugated wall 16 using the pry tab 62 of the cargo restraint device 20, which is facilitated by the connectors 110.

The cargo restraint assembly 10 may have any suitable dimensions depending on the dimensions of the corrugations of the corrugated walls 16 and depending on the dimensions of the selected elongated support 12. For example, the dimensions of the cargo restraint assembly 10 can complement the dimensions of the corrugated walls 16 of the type containers used by rail owned or rail associated carriers such as, for example, Norfolk Southern, Union Pacific, CSX, BNSF, CN, or CP, and can be configured to selectively receive a wood 2×4 or a 4×4. With this embodiment, the width of the cavity 50 may be about 3⅝ inches; the width of the base 42 as measured from the outsides of the lateral support walls 44 may be about 3¹⁵⁄₁₆ inches; the width of each of the securing surface 60 of the cargo restraint device 20 and the securing surface 120 of the cargo restraint bracket 22 may be about 2⅝ inches, the length of the securing surface 60 of the cargo restraint device 20 may be about 7.62 inches; the length of the securing surface 120 of the cargo restraint bracket 22 and the lengths of the lateral support walls 44 and the mounting wall 122 are each about 5.56 inches.

The cargo restraint assembly 10 is more effective than prior art products because it can perform well in railcars, semi-trailers or other containers 14 having corrugated walls 16 and also can instead be used with flat walls. Because of the configuration of the cargo restraint device 10 and the cargo restraint bracket 22, the cargo restraint assembly 10 is easy to install such that each of the cargo restraint device and the cargo restraint bracket 22 is secured to either a peak 30 or trough 32 of the corrugated walls 16 or to a flat wall and the cargo restraint assembly is able to withstand substantial cargo loads. Additionally, the cargo restraint device 20 is configured to engage different sized elongated supports 12 especially where the widths of the peaks and troughs may be less than the lateral dimension of the elongated support. The cargo restraint devices 20 also are configured such that the elongated supports 12 can be readily pried away and separated from the sleeve members 40 and such that the cargo restraint devices 20 can also be readily removed from the corrugated walls 16.

The present disclosure also includes a method for engaging the elongated support 12 for restraining cargo in the container 14. The method may include securing to one of the walls of the container the sleeve member 40. If the wall is corrugated, this may include selectively securing the sleeve member to one of the peaks or one of the troughs. The method also includes engaging the sleeve member and the cargo restraint bracket 22 by, for example, selectively inserting one of the connectors 110 into the slot 130 of the cargo restraint bracket and securing the securing surface of the bracket to the wall which, if the wall is corrugated, includes selectively securing the securing surface 120 of the bracket to the other one of the peaks or one of the troughs. The method includes adjustably positioning the bracket relative to the sleeve member 40 of the cargo restraint device 20 by sliding the bracket 22 relative to the sleeve member and inserting the end of the elongated support 12 into the cavity 50 to engage the elongated support and the sleeve member. These steps may be performed with another cargo restraint assembly 10 on the other wall of the container.

While embodiments have been illustrated and described in the drawings and foregoing description, such illustrations and descriptions are considered to be exemplary and not restrictive in character, it being understood that only illustrative embodiments have been shown and described and that all changes and modifications that come within the spirit of the disclosure are desired to be protected. The description and figures are intended as illustrations of embodiments of the disclosure, and are not intended to be construed as having or implying limitation of the disclosure to those embodiments. There are a plurality of advantages of the present disclosure arising from various features set forth in the description. It will be noted that alternative embodiments of the disclosure may not include all of the features described yet still benefit from at least some of the advantages of such features. Those of ordinary skill in the art may readily devise their own implementations of the disclosure and associated methods, without undue experimentation, that incorporate one or more of the features of the disclosure and fall within the spirit and scope of the present disclosure and the appended claims.

The invention claimed is:

1. A method for engaging an elongated support for restraining cargo in a container having a pair of spaced walls, the method comprising:
   securing to one of the walls a cargo restraint device comprising a sleeve member defining a cavity for receiving an end of the elongated support, including securing a securing surface of a base of the sleeve member to said one wall;
   engaging the sleeve member and a bracket having a securing surface securable to said one wall;
   securing the bracket to said one wall adjacent the cargo restraint device; and
   inserting the end of the elongated support into the cavity to engage the elongated support and the sleeve member.

2. The method of claim 1 wherein securing the securing surface of the bracket to said one wall includes securing the securing surface of the bracket selectively on either side of said the cargo restraint device.

3. The method of claim 1 wherein securing the securing surface of the bracket to said one wall includes adjustably positioning the bracket relative to the cargo restraint device.

4. The method of claim 3 wherein the bracket is slidable relative to the cargo restraint device for adjustability positioning the bracket relative to the cargo restraint device.

5. The method of claim 3 wherein said one wall is corrugated and adjustably positioning includes selectively positioning the bracket in a first position relative to the cargo restraint device when the sleeve member is secured to a peak of said one wall and in a second position relative to the cargo restraint device when the sleeve member is secured to a trough of said one wall.

6. The method of claim 3 wherein adjustably positioning includes selectively positioning the bracket so that the securing surface of the cargo restraint device and the securing surface of the bracket are substantially flush.

7. The method of claim 1 wherein engaging the sleeve member and the bracket includes inserting an engagement member of the sleeve member into a slot defined by the bracket.

8. The method of claim 1 wherein the sleeve member includes two engaging members and engaging the sleeve member and the bracket includes inserting selectively either one of the engagement members into a slot defined by the bracket.

9. The method of claim 1 wherein engaging the sleeve member and the bracket includes inserting into a slot defined by the bracket an engagement member of the sleeve member having a T-shaped cross section extending along a support wall of the sleeve member.

10. The method of claim 1 wherein the sleeve member has a pair of lateral support walls and an engagement member on each support wall and wherein engaging the sleeve member and the bracket includes selectively inserting into a slot defined by the bracket either one of the engagement members.

11. The method of claim 1 wherein inserting the end of the elongated support into the cavity to engage the elongated support includes selectively selecting as the elongated support an elongated support having a first dimension receivable by the cavity or an elongated support having a second dimension receivable by the cavity.

12. The method of claim 1 wherein inserting the end of the elongated support into the cavity to engage the elongated support includes selectively selecting as the elongated support a wood 2×4 receivable by the cavity or a wood 4×4 receivable by the cavity.

13. The method of claim 1 further including:
securing to another of the walls another cargo restraint device comprising a sleeve member defining a cavity for receiving another end of the elongated support, including securing a securing surface of a base of the sleeve member of the other cargo restraint device to said other wall;
engaging the sleeve member of the other cargo restraint device and another bracket having a securing surface securable to said other wall;
securing the other bracket to said other wall adjacent the sleeve member of the other cargo restraint device; and
inserting another end of the elongated support into the cavity of the sleeve member of the other cargo restraint device to engage the elongated support and the sleeve member of the other cargo restraint device.

14. A method for engaging an elongated support for restraining cargo in a container having a pair of spaced walls, the method comprising:
securing to one of the walls a cargo restraint device comprising a sleeve member defining a cavity for receiving an end of the elongated support and having a pair of engagement members and a base having a securing surface for securing the sleeve member to said one wall, the cavity being sized to receive as the elongated support selectively a wood 2×4 or a wood 4×4;
engaging the sleeve member and a bracket having a securing surface securable to the wall by inserting one of the engaging members into a slot defined by the bracket;
securing the securing surface of the bracket to the wall, including adjustably positioning the bracket relative to the cargo restraint device by sliding the bracket relative to the cargo restraint device; and
inserting the end of the elongated support into the cavity to engage the elongated support and the sleeve member.

15. The method of claim 14 wherein securing the securing surface of the bracket includes securing the securing surface of the bracket selectively on either side of said sleeve member.

16. The method of claim 14 wherein said one wall is corrugated and adjustably positioning includes selectively positioning the bracket in a first position relative to the cargo restraint device when the sleeve member is secured to a peak of said one wall and in a second position relative to the cargo restraint device when the sleeve member is secured to a trough of said one wall.

17. The method of claim 14 wherein adjustably positioning includes selectively positioning the bracket so that the securing surface of the cargo restraint device and the securing surface of the bracket are substantially flush.

18. The method of claim 14 further including:
securing to the other wall another cargo restraint device comprising a sleeve member defining a cavity for receiving another end of the elongated support and having a pair of engagement members and a base having a securing surface for securing the sleeve member to said other wall, the cavity of the sleeve member of the other cargo restraint device being sized to receive as the elongated support selectively a wood 2×4 or a wood 4×4;
engaging the sleeve member of the other cargo restraint device and another bracket having a securing surface securable to said other wall by selectively inserting one of the engaging members of the sleeve member of the other cargo restraint device into a slot defined by the other bracket;
securing the securing surface of the other bracket to said other wall, including adjustably positioning the other bracket relative to the cargo restraint device of the other cargo restraint device by sliding the other bracket relative to the cargo restraint device of the other cargo restraint device; and
inserting the other end of the elongated support into the cavity of the sleeve member of the other cargo restraint device to engage the elongated support and the sleeve member of the other cargo restraint device.

* * * * *